(12) United States Patent
Milne et al.

(10) Patent No.: US 8,895,483 B2
(45) Date of Patent: Nov. 25, 2014

(54) DISPROPORTIONATE PERMEABILITY REDUCTION USING A VISCOELASTIC SURFACTANT

(75) Inventors: Arthur Milne, Buenos Aires DC (AR); Manuel Jose Lastre Buelvas, Bogota (CO)

(73) Assignee: Schlumberger Technology Corporation, Sugar Land, TX (US)

( * ) Notice: Subject to any disclaimer, the term of this patent is extended or adjusted under 35 U.S.C. 154(b) by 233 days.

(21) Appl. No.: 12/433,977

(22) Filed: May 1, 2009

(65) Prior Publication Data

US 2009/0275490 A1 Nov. 5, 2009

Related U.S. Application Data

(60) Provisional application No. 61/126,496, filed on May 5, 2008.

(51) Int. Cl.
*C09K 8/68* (2006.01)
*C09K 8/504* (2006.01)

(52) U.S. Cl.
CPC ............. *C09K 8/68* (2013.01); *C09K 2208/30* (2013.01)
USPC ........... 507/244; 507/200; 507/266; 507/267; 507/276; 507/277; 166/305.1

(58) Field of Classification Search
None
See application file for complete search history.

(56) References Cited

U.S. PATENT DOCUMENTS 4,735,731 A * 4/1988 Rose et al. .................... 507/105
5,979,557 A   11/1999 Card et al.
6,239,183 B1 * 5/2001 Farmer et al. ................. 516/102
6,258,859 B1 * 7/2001 Dahayanake et al. ........... 516/77
6,435,277 B1  8/2002 Qu et al.
6,506,710 B1  1/2003 Hoey et al.

(Continued)

FOREIGN PATENT DOCUMENTS

EP   1634938    3/2006
WO   9856497   12/1998

(Continued)

OTHER PUBLICATIONS

SPE79012—Gino Di Lullo, Phil Rae, James Curtis; New Insights Into Water Control—A Review of the State of the Art—Part II; Society of Petroleum Engineers; 2002; pp. 1-10; Presented at SPE International Thermal Operations and Heavy Oil Symposium and International Horizontal Well Technology Conference; Calgary, Alberta, Canada; Nov. 2002.

(Continued)

*Primary Examiner* — John J Figueroa
(74) *Attorney, Agent, or Firm* — Jeremy D. Tillman; Rachel E. Greene; Tim Curington

(57) ABSTRACT

The invention discloses a method of for changing the water permeability of a subterranean formation of a well, the method comprising: providing a fluid comprising a liquid carrier and a viscoelastic surfactant; introducing the fluid into the well; and contacting the fluid and the subterranean formation wherein the action of the liquid carrier and the viscoelastic surfactant is able to change the water permeability of the subterranean formation. The fluid may further comprise methanol, or a salt which can be embodied within the carrier fluid. Advantageously, no further RPM polymer is used. In a first aspect the method is used for reducing the amount of water produced, in as second aspect for improving the oil recovery.

15 Claims, 7 Drawing Sheets

(56) References Cited

U.S. PATENT DOCUMENTS

| | | | |
|---|---|---|---|
| 6,767,868 B2 * | 7/2004 | Dawson et al. | 507/236 |
| 6,767,869 B2 | 7/2004 | DiLullo et al. | |
| 6,881,709 B2 * | 4/2005 | Nelson et al. | 507/203 |
| 6,908,888 B2 * | 6/2005 | Lee et al. | 507/219 |
| 7,008,908 B2 | 3/2006 | Chan et al. | |
| 7,060,661 B2 | 6/2006 | Dobson et al. | |
| 7,084,095 B2 | 8/2006 | Lee et al. | |
| 7,115,546 B2 | 10/2006 | Qu et al. | |
| 7,119,050 B2 * | 10/2006 | Chang et al. | 507/244 |
| 7,144,844 B2 | 12/2006 | Qu et al. | |
| 7,288,505 B2 * | 10/2007 | Chang et al. | 507/244 |
| 7,299,870 B2 * | 11/2007 | Garcia-Lopez De Victoria et al. | 166/279 |
| 7,303,018 B2 | 12/2007 | Cawiezel et al. | |
| 7,326,670 B2 | 2/2008 | DiLullo et al. | |
| 7,510,009 B2 | 3/2009 | Cawiezel et al. | |
| RE41,585 E * | 8/2010 | Farmer et al. | 516/102 |
| 2002/0189810 A1 | 12/2002 | DiLullo et al. | |
| 2003/0134751 A1 | 7/2003 | Lee et al. | |
| 2003/0168217 A1 * | 9/2003 | Zhang et al. | 166/308 |
| 2004/0102331 A1 | 5/2004 | Chan et al. | |
| 2005/0003969 A1 | 1/2005 | DiLullo et al. | |
| 2005/0020454 A1 * | 1/2005 | Francini et al. | 507/203 |
| 2006/0266522 A1 | 11/2006 | Eoff et al. | |
| 2007/0029085 A1 | 2/2007 | Panga et al. | |
| 2008/0318812 A1 | 12/2008 | Kakadjian, Sr. et al. | |

FOREIGN PATENT DOCUMENTS

| | | | |
|---|---|---|---|
| WO | WO 9856497 A1 * | 12/1998 | |
| WO | 02084075 | 10/2002 | |
| WO | 2007017806 A2 | 2/2007 | |

OTHER PUBLICATIONS

SPE 68972—Al-Sharji, H.H., Grattoni, C.A., Dawe, R.A., Zimmerman, R.W.—Disproportionate Permeability Reduction Due to Polymer Adsorption Entanglement. 2001 Society of Petroleum Engineers—SPE European Formation Damage Conference held in The Hague, The Netherlands, May 21-22, 2001.

Grattoni, C.A., Luckham, P.F., Jing, X.D., Norman, L., Zimmerman, R.W.—Polymers as relative permeability modifiers: adsorption and the dynamic formation of thick polyacrylamide layers. Journal of Petroleum Science and Engineering 45 (2004) 233-245.

Li, et al., "Experimental Study of Wettability Alteration to Preferential Gas-Wetting in Porous Media and Its Effects", SPE Reservoir Evaluation & Engineering, vol. 3, No. 2, Apr. 2000, pp. 139-149, Society of Petroleum Engineers.

Tang, et al., "Relative Permeability Modification in Gas/Liquid Systems Through Wettability Alteration to Intermediate Gas Wetting", SPE Reservoir Evaluation & Engineering, vol. 5, No. 6, Dec. 2002, pp. 427-436, Society of Petroleum Engineers.

Tang, et al., "Wettability Alteration to Intermediate Gas-Wetting in Porous Media at Elevated Temperatures", Transport in Porous Media, vol. 52, Issue 2, Aug. 2003, pp. 185-211, 2003, the Netherlands, Kluwer Academic Publishers.

* cited by examiner

DISPROPORTIONATE PERMEABILITY REDUCTION USING A VISCOELASTIC SURFACTANT

RELATED APPLICATIONS

The present application claims the benefit of U.S. Provisional Patent Application No. 61/126,496 filed May 5, 2008, entitled Disproportionate permeability reduction using a viscoelastic surfactant, which is hereby incorporated by reference.

FIELD OF THE INVENTION

This invention relates to compositions and methods for treating subterranean formations penetrated by well bores. More particularly, the invention relates to additives for modifying permeability and most particularly, to viscoelastic surfactant for use in hydraulic fracturing fluids for permeability reduction.

BACKGROUND

The statements in this section merely provide background information related to the present disclosure and may not constitute prior art.

Most mature sandstone reservoirs produce crude oil along with an increasing volume of water. The percentage of water is defined as the Water Oil Ratio (WOR) for a given well. The water may either be what is known as good water, which displaces the crude oil out of the reservoir or bad water which is produced without contributing to the production of crude. Bad water is often the result of water invading the reservoir and communicating with the wellbore through permeable channels/fissures etc. As the water usually has a much lower viscosity than the crude oil at reservoir conditions, the effective permeability of the formation to water is much higher than to crude, which tends to result in more water than crude being produced once the water is in direct communication with the wellbore. Bad water production generally increases with time, as the water invades more of the reservoir and after stimulation treatments. The treatment either selectively stimulates the intervals with water due to differences in relative permeability (in the case of matrix treatment), or due to increased communication with the water bearing intervals in the case of a hydraulic fracturing.

In some cases it may be possible to decrease the production of water using a chemical or more commonly a polymer which provides a disproportionate permeability reduction with respect to water. These polymers are more commonly known as Relatively Permeability Modifiers (RPM) and decrease the effective permeability of the reservoir to water without decreasing the effective permeability to crude. An RPM is usually a low viscosity polymer which when injected into the matrix a) is highly charged and adheres to the surfaces in the pore spaces, and b) through a number of different mechanisms, such as swelling in the presence of water, reduces the size of the pore throats and hence the relative permeability of the matrix to water. The success of an RPM treatment depends among other things on distance from the sandface that the RPM can be placed; the greater the distance, the longer the effect of the RPM will last. RPMs have been used to treat both stimulated and un-stimulated reservoirs. In the case of stimulated reservoirs, RPMs have been included as part of both matrix and hydraulic fracturing treatments.

SUMMARY OF THE INVENTION

Disclosed are gelled hydrocarbon fluids formed from a mixture of at least a hydrocarbon (e.g. diesel, mineral spirits), a gelling agent including a viscoelastic surfactant, such as zwitterionic surfactant (e.g., erucic amidopropyl dimethyl betaine), and a metal carboxylate crosslinker (e.g., aluminum octoate). Methods of using such fluids are disclosed as well. In some embodiments, no fatty acid is included with the VES component.

The invention discloses a method for changing the water permeability of a subterranean formation of a well, the method comprising: providing a fluid comprising a liquid carrier and a viscoelastic surfactant; introducing the fluid into the well; and contacting the fluid and the subterranean formation wherein the action of the liquid carrier and the viscoelastic surfactant is able to change the water permeability of the subterranean formation.

Contacting the fluid and the subterranean formation may further comprise fracturing the formation. Fracturing may further be made with proppant.

The liquid carrier can be water, brine or other type of fluids. The fluid can further comprise a salt, or the salt can be included directly in the liquid carrier. The salt can be selected from the group consisting of: sodium chloride, ammonium chloride, potassium chloride, calcium chloride, calcium carbonate, sodium carbonate, and combinations thereof. Preferentially, the salt is present in an amount of 0.1% to 5% by weight, more preferentially the salt is present in an amount of 1% to 3% by weight.

In an embodiment, the viscoelastic surfactant is betaine. Advantageously, the viscoelastic surfactant is present in an amount of 0.001% to 1% by weight. More advantageously, the viscoelastic surfactant is present in an amount of 0.01% to 0.5% by weight. The fluid can further comprise methanol, advantageously in an amount of 5% to 15% by weight.

In a first aspect, the method is used for reducing the amount of water produced from a subterranean formation of a well, the method comprising: providing a fluid comprising a liquid carrier, a salt and a viscoelastic surfactant, wherein the fluid has relative permeability properties; introducing the fluid into the well; and contacting the fluid and the subterranean formation.

Advantageously, no relatively permeability modifier polymer is further added.

Contacting the fluid and the subterranean formation may further comprise fracturing the formation. Fracturing may further be made with proppant.

The liquid carrier can be water, brine or other type of fluids. The salt can be included directly in the liquid carrier. The salt can be selected from the group consisting of: sodium chloride, ammonium chloride, potassium chloride, calcium chloride, calcium carbonate, sodium carbonate, and combinations thereof. Preferentially, the salt is present in an amount of 0.1% to 5% by weight, more preferentially the salt is present in an amount of 1% to 3% by weight.

In an embodiment, the viscoelastic surfactant is betaine. Advantageously, the viscoelastic surfactant is present in an amount of 0.001% to 1% by weight. More advantageously, the viscoelastic surfactant is present in an amount of 0.01% to 0.5% by weight. The fluid can further comprise methanol, advantageously in an amount of 5% to 15% by weight.

In a second aspect, the method is used for improving the oil recovery from a subterranean formation of a well, the method comprising: providing a fluid comprising a liquid carrier and a viscoelastic surfactant; introducing the fluid into the well; and contacting the fluid and the subterranean formation wherein the action of the liquid carrier and the viscoelastic surfactant is able to improve oil mobility in the subterranean formation.

Contacting the fluid and the subterranean formation may further comprise fracturing the formation. Fracturing may further be made with proppant.

The liquid carrier can be water, brine or other type of fluids. The salt can be included directly in the liquid carrier. The salt can be selected from the group consisting of: sodium chloride, ammonium chloride, potassium chloride, calcium chloride, calcium carbonate, sodium carbonate, and combinations thereof. Preferentially, the salt is present in an amount of 0.1% to 5% by weight, more preferentially the salt is present in an amount of 1% to 3% by weight.

In an embodiment, the viscoelastic surfactant is betaine. Advantageously, the viscoelastic surfactant is present in an amount of 0.001% to 1% by weight. More advantageously, the viscoelastic surfactant is present in an amount of 0.01% to 0.5% by weight. The fluid can further comprise methanol, advantageously in an amount of 5% to 15% by weight.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein. The components in the figures are not necessarily to scale, with the emphasis instead being placed upon clearly illustrating principles of the present invention.

DETAILED DESCRIPTION

Figure 1:
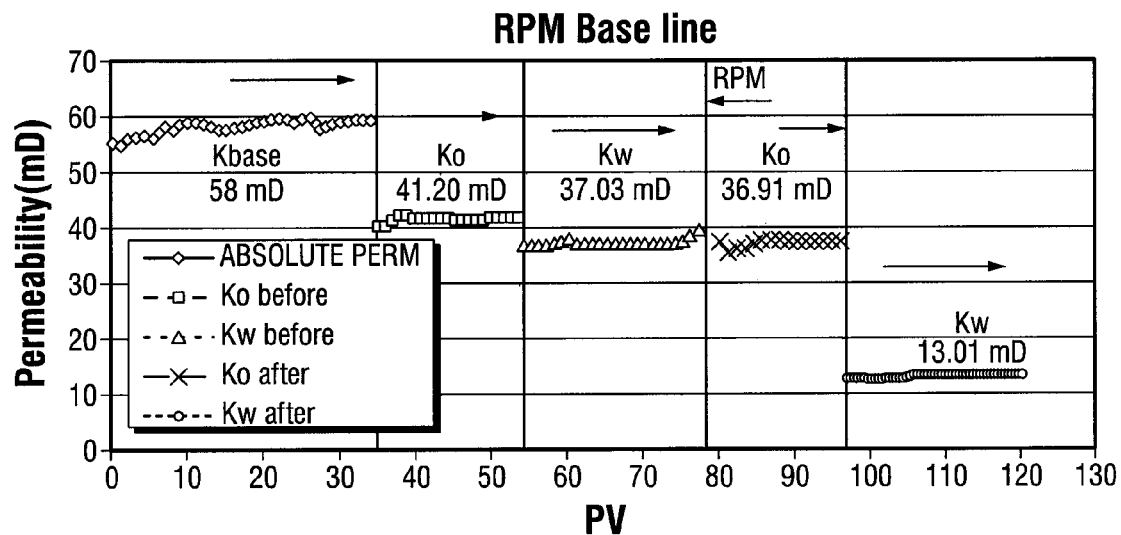
FIG. 1 and FIG. 2 show comparison between effective permeability to water and oil of a prior art RPM polymer and of the composition according to one embodiment of the invention.

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The following definitions are provided in order to aid those skilled in the art in understanding the detailed description of the present invention.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactants" or "VES" refers to that class of compounds which can form micelles (spherulitic, anisometric, lamellar, or liquid crystal) in the presence of counter ions in aqueous solutions, thereby imparting viscosity to the fluid. Anisometric micelles in particular are preferred, as their behavior in solution most closely resembles that of a polymer.

One embodiment of the invention is directed towards a fluid for modifying the permeability of a subterranean formation, the fluid comprising a liquid carrier with a salt, and a viscoelastic surfactant in low concentration.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields.

A salt should be present in the liquid carrier. The salt can be present naturally if brine is used, or can be added to the liquid carrier. For example, it is possible to add to water; any salt, such as an alkali metal or alkali earth metal salt ($NaCO_3$, NaCl, KCl, etc.). The salt is generally present in weight percent concentration between about 0.1% to about 5%. Presently preferred concentrations of salt are about 1% to about 3% by weight. A presently more preferred concentration is about 2% by weight.

The liquid carrier can further comprise a co-solvent as for example methanol. The co-solvent is generally present in weight percent concentration between about 1% to about 20%. Presently preferred concentrations of salt are about 5% to about 15% by weight. A presently more preferred concentration is about 10% by weight.

The pH of the liquid carrier can generally be any pH compatible with downhole formations. The pH is presently preferred to be about 6.5 to about 10.0. The pH can be about the same as the formation pH.

The viscoelastic surfactant can generally be any viscoelastic surfactant. Viscoelastic surfactants useful in the fluid may be any suitable VES. The surfactant is present in a low weight percent concentration. Presently preferred concentrations of surfactant are about 0.001% to about 1% by weight. A presently more preferred concentration is about 0.01% to about 0.5% by weight.

The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

Non-limiting examples of suitable viscoelastic surfactants useful for viscosifying some fluids include cationic surfactants, anionic surfactants, zwitterionic surfactants, amphoteric surfactants, nonionic surfactants, and combinations thereof.

In general, particularly suitable zwitterionic surfactants have the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

In an embodiment of the invention, a zwitterionic surfactants of the family of betaine is used. Two suitable examples of betaines are BET-O and BET-E. The surfactant in BET-0-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U.S. Patent Application Publication No. 2003-0134751. The surfactant in BET-E-40 is also shown below; one chemical name is erucylamidopropyl betaine. As-received concentrates of BET-E-40 were used in the experiments reported below, where they will be referred to as "VES". BET surfactants, and other VES's that are suitable for the present invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

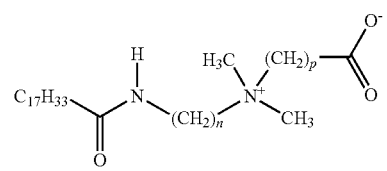

Surfactant in BET-O-30 (when n = 3 and p = 1)

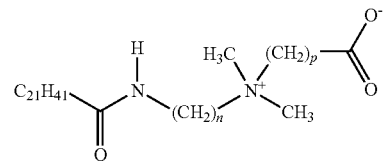

Surfactant in BET-E-40 (when n = 3 and p = 1)

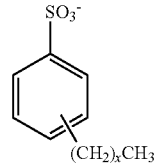

SDBS (when x = 11 and the counter-ion is $Na^-$)

Some embodiments of the present invention use betaines; most preferred use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 10%, preferably from about 1 to about 5%, and most preferably from about 1.5 to about 4.5%.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference. Examples of suitable cationic viscoelastic surfactants include cationic surfactants having the structure:

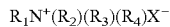

$$R_1N^+(R_2)(R_3)(R_4)X^-$$

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4) X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, copolymers, and mixtures of these members. They may also contain performance enhancers, such as viscosity enhancers, for example polysulfonates, for example polysulfonic acids, as described in U.S. Pat. No. 7,084,095 which is hereby incorporated by reference.

Another suitable cationic VES is erucyl bis(2-hydroxyethyl)methyl ammonium chloride, also known as (Z)-13 docosenyl-N—N-bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl)rapeseed ammonium chloride; oleyl methyl bis(hydroxyethyl)ammonium chloride; erucylamidopropyltrimethylamine chloride, octadecyl methyl bis(hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4,-dichlorobenzoate; cetyl tris(hydroxyethyl)ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris(hydroxyethyl) ammonium bromide; hexadecyl ethyl bis(hydroxyethyl)ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl)methyl ammonium chloride, inherently have short re-heal times and the rheology enhancers of the present invention may not be needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

According to a first embodiment of the invention, the fluid is injected as a treating fluid in formations producing with a high water cut to selectively reduce the volume of water produced, in the same or similar way that RPM polymers are currently used. In accordance with this embodiment, the fluid is introduced into the formation by way of the well bore. The treatment fluid and other components employed at the well site can be admixed in a suitable blender, batch mixer or the like. The principle advantage of the fluid is low viscosity for application in low and very low permeability formations in which a polymer fluid can not be injected.

According to a second embodiment of the invention, the fluid is used in stimulation operations. For example, if the fluid is included in a fracturing fluid when treating wet producers to decrease the production of water after the treatment. The base fracturing fluid and other components employed can be admixed together in a blender at the well site. In fracturing operations, proppant material can be added to the fluid before injection downhole. Any conventional proppant can be used. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, preferably pre-cured resin coated, provided that the resin and any other chemicals that might be released from the coating or come in contact with the other chemicals of the invention are compatible with them. In a further embodiment, the fluid is used in combination with a slickwater job or post-treatment after a slickwater job.

The low viscosity of the fluid assists when used in fracturing fluids as the filtrate will have a viscosity equivalent to or less than water and so can freely leakoff into the fracture face. This is in marked contrast to the use of a conventional polymer RPM in a fracturing fluid in which case the RPM polymer acts to reduce the fluid leakoff by a factor of 10, limiting the volume of the RPM polymer which leaks off into the fracture face matrix. This in turn limits the effectiveness, both in the degree to which the effective permeability to water of the fracture face is reduced and the resistance of the polymer to erosion due to flow through the matrix.

In a third embodiment, the fluid is injected as an overflush for a matrix stimulation treatment to reduce the water production after the treatment. The treatment of the formation is done with brine or gas or oil, in order to push the fluid into the formation. The overflush with gas also has the purpose of re-establishing the connectivity of the gas layer (in gas wells).

The method of the invention is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

Any additives normally used in well treatment fluids can be included, again provided that they are compatible with the other components and the desired results of the treatment. Such additives can include, but are not limited to breakers, anti-oxidants, crosslinkers, corrosion inhibitors, delay agents, biocides, buffers, fluid loss additives, pH control agents, solid acids, solid acid precursors, etc. The wellbores treated can be vertical, deviated or horizontal. They can be completed with casing and perforations or open hole.

EXAMPLES

A series of experiments were conducted to compare effectiveness of the fluid with prior art RPM. All of the tests in the following section have been performed (in duplicate) using a number of different Colombian crude oils.

Permeability Experiments

Figure 2:
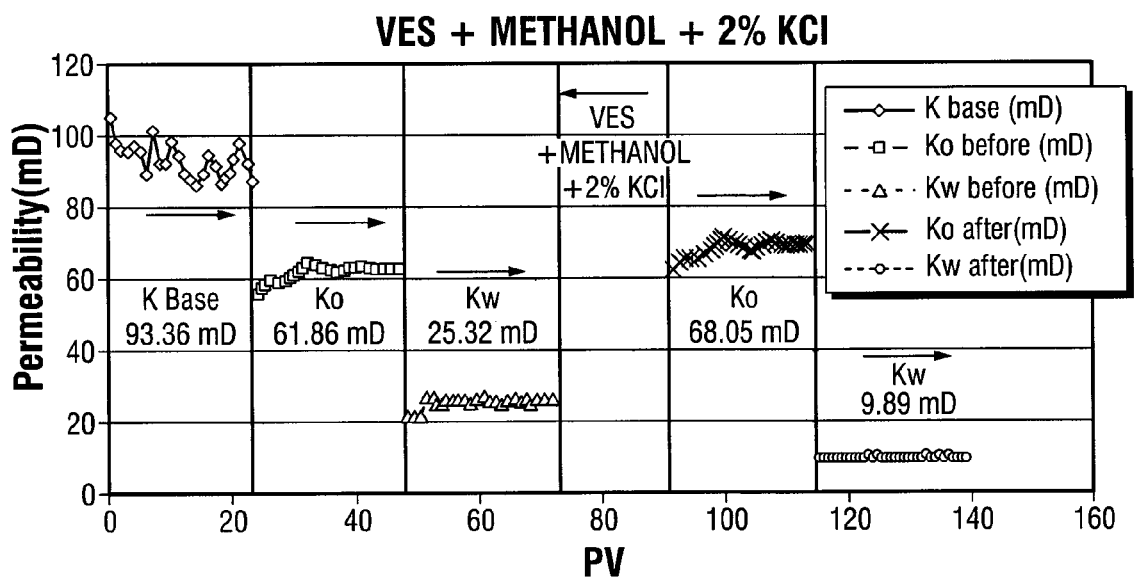

To illustrate some embodiments according to the invention, a comparison of the fluid with a conventional RPM was done, the changes in the effective permeability to water and oil after injecting into a core at 71° C. a 0.24% by weight solution of a conventional RPM in a 2% KCl brine are shown in FIG. 1. FIG. 2 shows the effective permeability to water an oil after the injection of 0.1% by weight VES in a 2% by weight KCl brine with 10% by weight methanol (Sample A).

Figure 3:
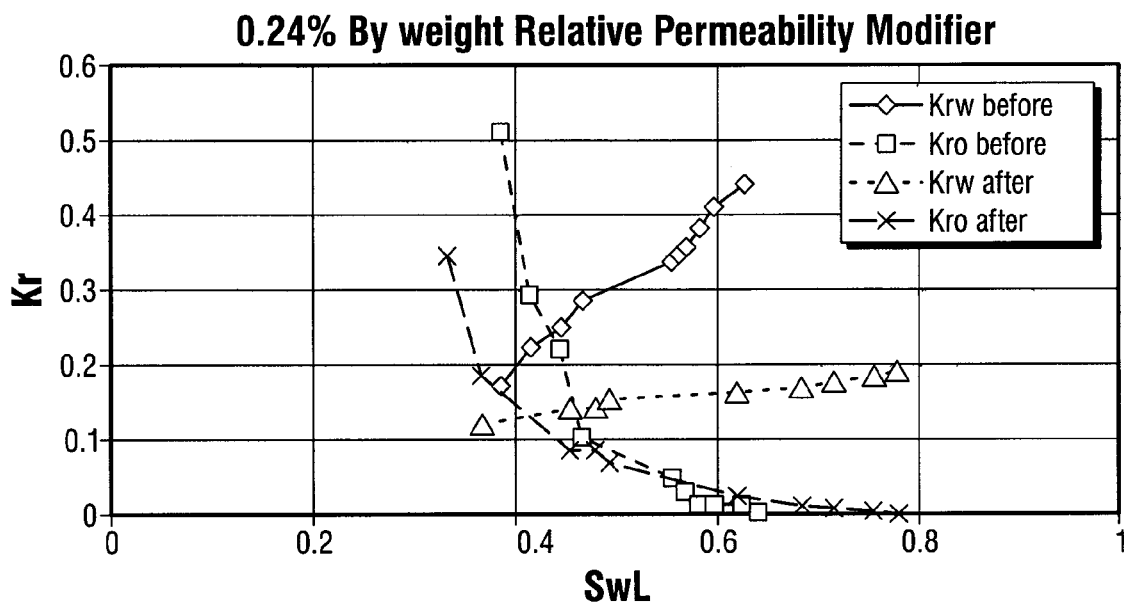
FIG. 3 and FIG. 4 show comparison between relative permeability of a prior art RPM polymer and of the composition according to one embodiment of the invention.
Figure 4:
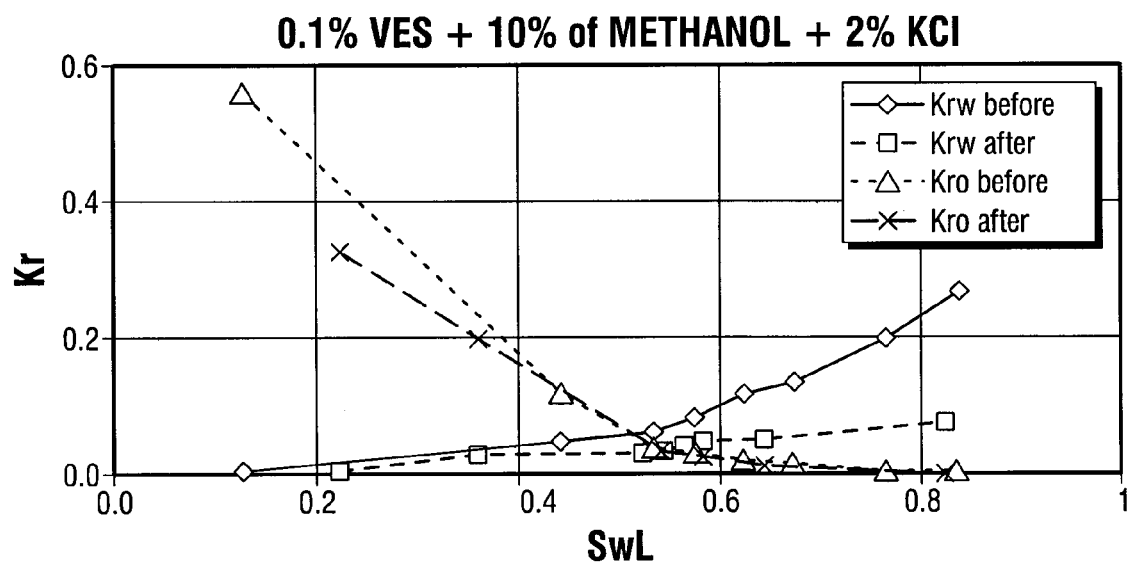
Figure 5:
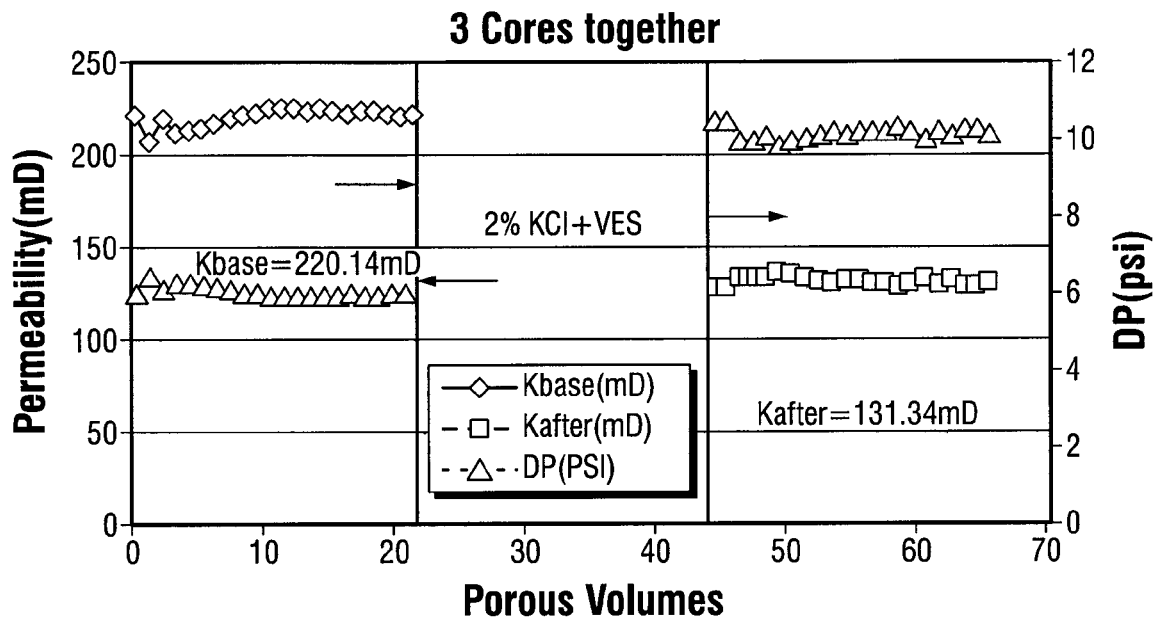
FIG. 5 shows reduction in effective permeability to water of the composition according to one embodiment of the invention.
Figure 6:
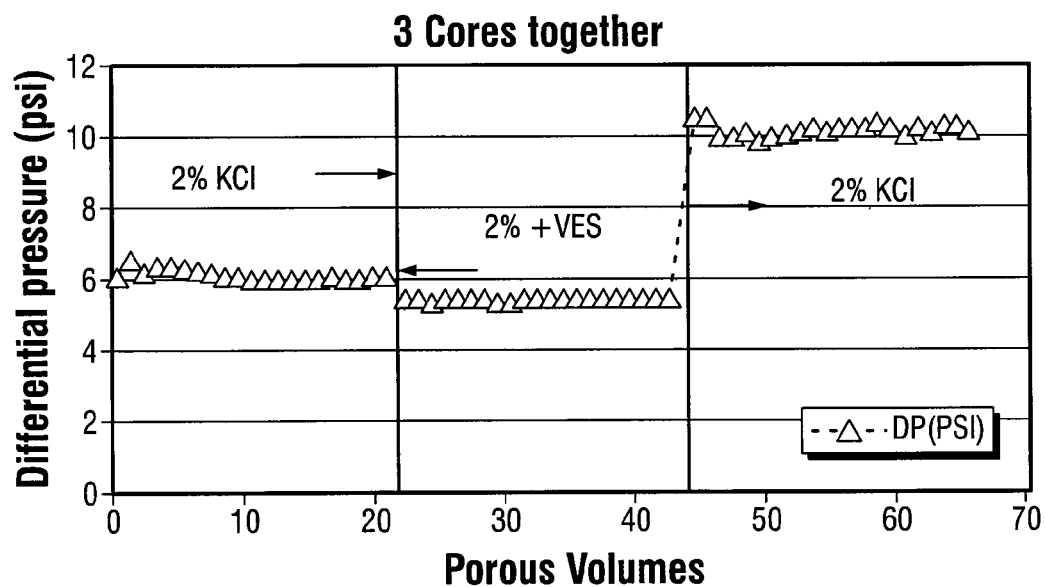
FIG. 6 shows drop in injection pressure of the composition according to one embodiment of the invention.
Figure 7:
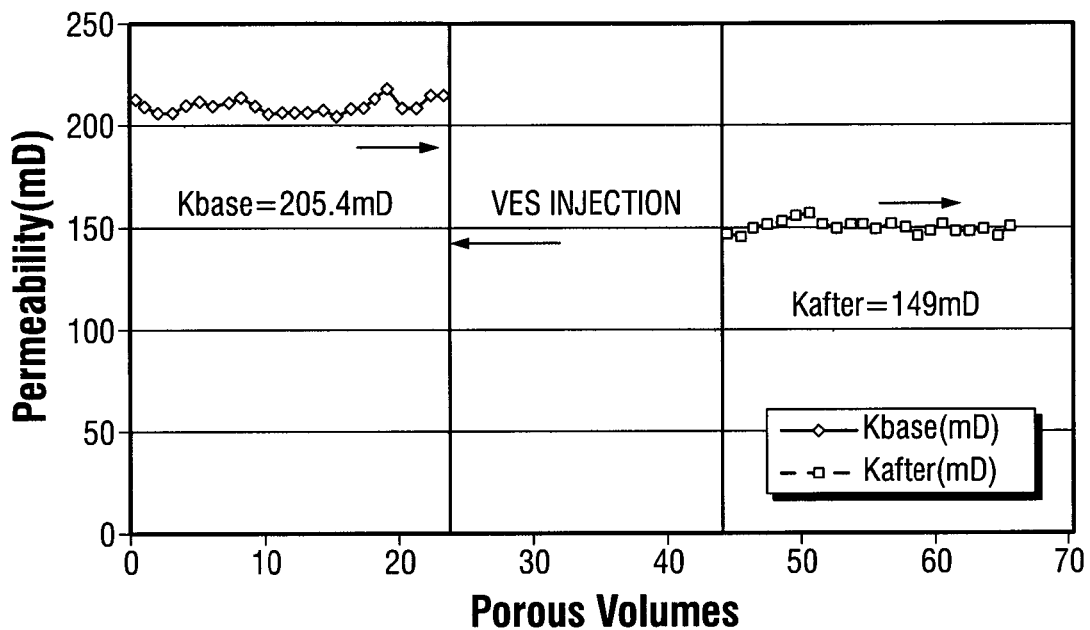
FIG. 7 shows permeability to water inlet core of the composition according to one embodiment of the invention.
Figure 8:
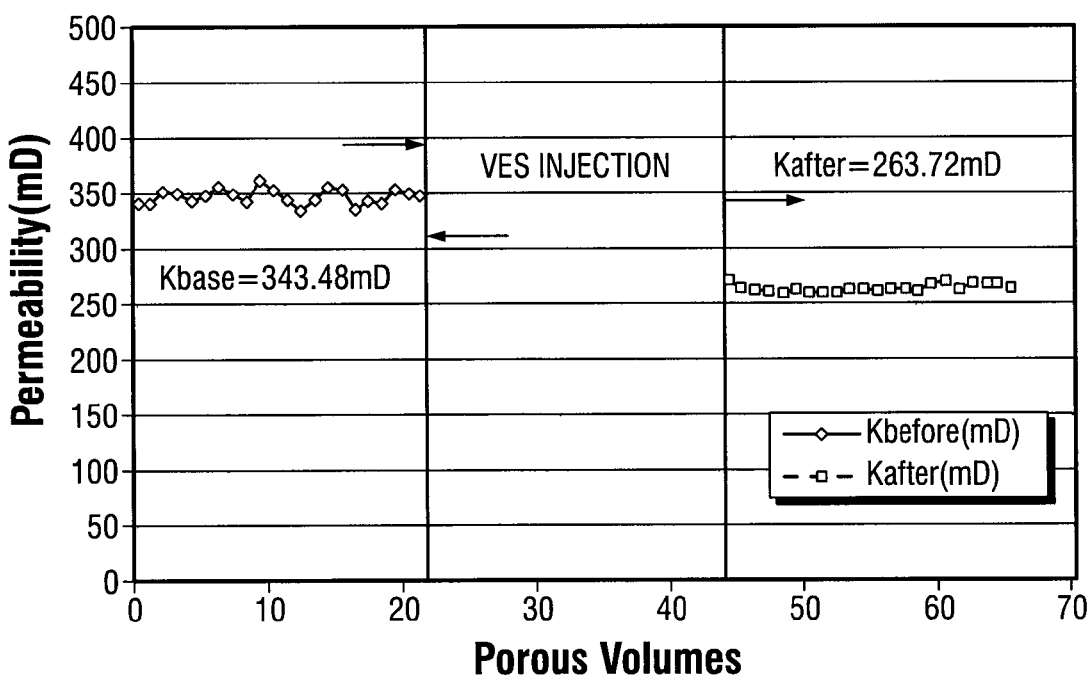
FIG. 8 shows permeability to water in outlet core of the composition according to one embodiment of the invention.

The relative permeability curves for the conventional RPM are shown in FIG. 3 and can be compared directly with those shown in FIG. 4 for sample A.

The changes in effective permeability to oil and water (FIGS. 1 and 2) are very similar to a case of using conventional polymer RPM and a low concentration of VES. Table 1 summarizes comparison results between FIGS. 1 and 2. The fluid according to the invention shows same or better effective permeability to oil and water than conventional RPM.

TABLE 1

|  | RPM | | | Sample A | | |
| --- | --- | --- | --- | --- | --- | --- |
|  | before | after | % change | before | after | % change |
| $K_w$ (mD) | 37 | 13.01 | −65% | 25.3 | 9.9 | −60% |
| $K_o$ (mD) | 41.2 | 36.9 | −10% | 62 | 68 | +9% |

The changes in residual saturations and permeability to water are also similar comparing the data presented in FIGS. 3 and 4. Those are summarized in table 2. The fluid according to the invention shows same residual saturations and permeability to water than conventional RPM.

TABLE 2

|  | RPM | | | Sample A | | |
| --- | --- | --- | --- | --- | --- | --- |
|  | before | after | % change | before | after | % change |
| $S_{wr}$ | 0.27 | 0.35 | +29% | 0.13 | 0.22 | +69% |
| $K_{ro}$ a $S_{wr}$ | 1.51 | 0.92 | −40% | 0.56 | 0.32 | −43% |
| $S_{or}$ | 0.36 | 0.22 | −40% | 0.17 | 0.19 | +12% |
| $K_{rw}$ a $S_{or}$ | 0.48 | 0.18 | −62% | 0.27 | 0.007 | −74% |

Penetration Rate Experiments

In a further test, the ability of the fluid to penetrate the matrix is determined. Also, the fluid system according to the invention is able of being injected into the matrix and being uniformly adsorbed onto the surface of the pores. This is illustrated by the following test using 3 cores in series at a temperature of 71° C. The first core A has a longitude of 6.84 cm, a diameter of 3.80 cm and a VP of 14.18 cc. The second core B has a longitude of 6.88 cm, a diameter of 3.80 cm and a VP of 13.09 cc. The third core C has a longitude of 6.82 cm, a diameter of 3.81 cm and a VP of 14.74 cc. The procedure of the test is to measure the absolute permeability of each core separately with 2% KCl solution at 3 cc/min, to measure the absolute permeability of all cores together with 2% KCl solution at 3 cc/min, to inject the fluid system according to the invention VES at 0.5 gpt with a 2% KCl at 3 cc/min, and to measure the retained permeability of all cores together with 2% KCl solution at 3 cc/min, and to measure the retained permeability of cores 1 and 3 separately with 2% KCl solution at 3 cc/min. Results are shown in FIGS. 5-8. The overall reduction in effective permeability to water of the three cores in series is 40% as shown on FIG. 5. There is a measureable decrease in the injection pressure 41 kPa to 34 kPa (6 psi to 5 psi) at the same injection rate (3 cc/min.) when injecting the fluid made of VES+2% KCl into the three cores, indicating that the capillary pressure in the porous medium is reduced as shown on FIG. 6. The change in permeability of the three cores when tested separately was practically the same indicating that a uniform layer of VES is adsorbed onto the surface of the pores. As shown on FIG. 7, core A (inlet) shows a 28% reduction and as shown on FIG. 8, core C (outlet) shows a 24% reduction. Change in permeability of core B (outlet) is a 24% reduction in the effective permeability to water. The small difference in the reduction in the effective permeability of the two cores is attributed to the difference in the absolute permeability.

Durability Experiments

A test was further provided to show the durability of the VES treatment into the matrix. The viscosity of viscoelastic surfactants is known to be greatly reduced when exposed to hydrocarbons due to change from worm-like micelles to small spherical micelles, while polymer RPMs are known to be eroded from the surface of the pore spaces due to the flow of fluids through the porous medium. For this reason a experiments were conducted to determine if any changes would occur if the porous medium treated with the fluid of the invention was exposed to the flow of hydrocarbon for an extended period of time.

The test sequence at 71° C., consists to (i) establish baseline permeability with formation water in producing direction, (ii) establish Permeability to crude in producing direction, (iii) establish permeability to formation water in producing direction, (iv) inject 20 PV of VES 1 gpt ("gpt" is gallons per thousand gallons of fracturing fluid)+10% Methanol+2% ammonium chloride (Sample B), (v) treat the fluid in injection direction, (vi) measure permeability to crude in producing direction, (vii) measure permeability to formation water in producing direction, (viii) flow 140 PV of crude in producing direction, (ix) shut-in for 24 hours with crude/water, (x) flow 70 PV of crude in producing direction, (xi) shut-in for 48 hours with crude, (xii) measure permeability to crude, (xiii) measure permeability to formation water. The results are summarized in FIGS. 9-10.

Figure 9:
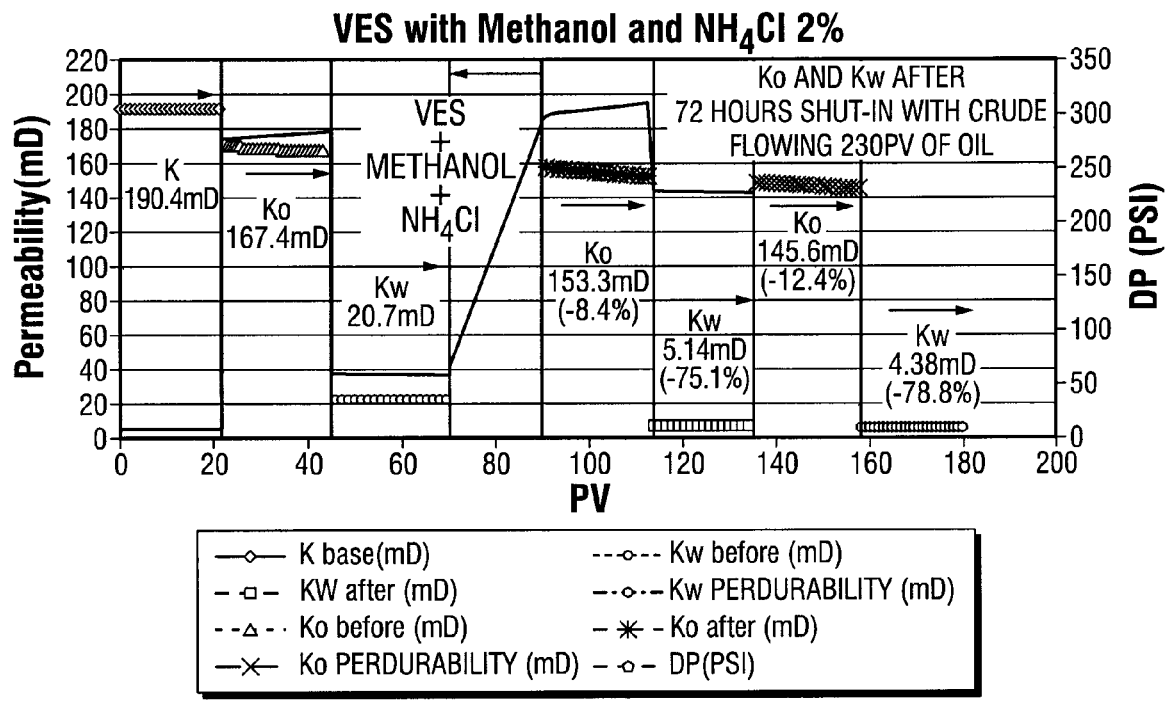
FIG. 9 shows permeability to water of the composition according to one embodiment of the invention.
Figure 10:
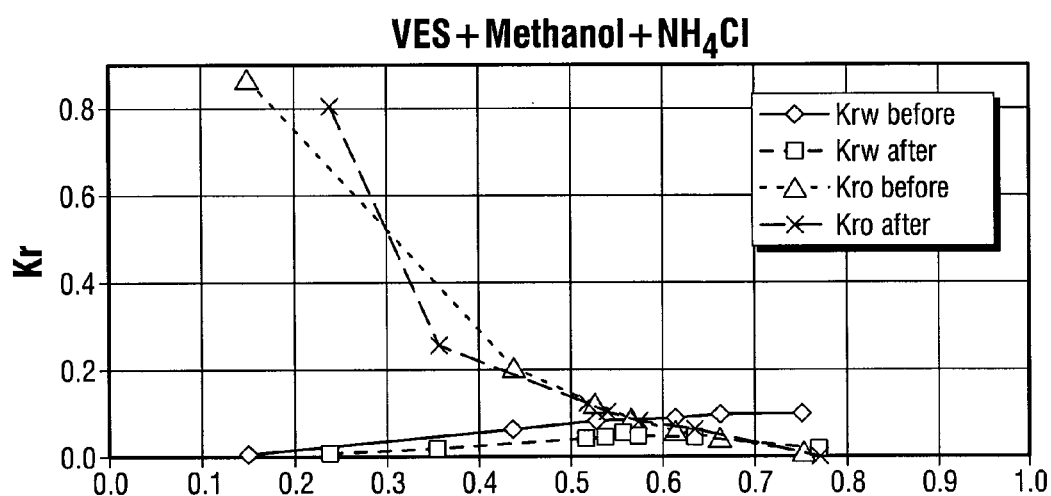
FIG. 10 shows relative permeability of the composition according to one embodiment of the invention.

It was observed the change in permeability to water due to the fluid is permanent as shown on FIG. 9. After 72 hours there is no change in permeability after treatment with the fluid. It confirms still presence of the fluid in pores of the formation. The relative permeability curves—initial and final—are shown in FIG. 10. Table 5 summarizes the changes in residual saturations and permeability to water.

TABLE 3

|  | Sample B | | |
| --- | --- | --- | --- |
|  | before | after | % change |
| $S_{wr}$ | 0.15 | 0.24 | +60% |
| $K_{ro}$ a $S_{wr}$ | 0.87 | 0.81 | −7% |
| $S_{or}$ | 0.15 | 0.13 | −13% |
| $K_{rw}$ a $S_{or}$ | 0.1 | 0.02 | −80% |

Those changes are quite comparable to previous measurements made and show no change over time of properties.

Fracturing Fluid Experiments

Figure 11:
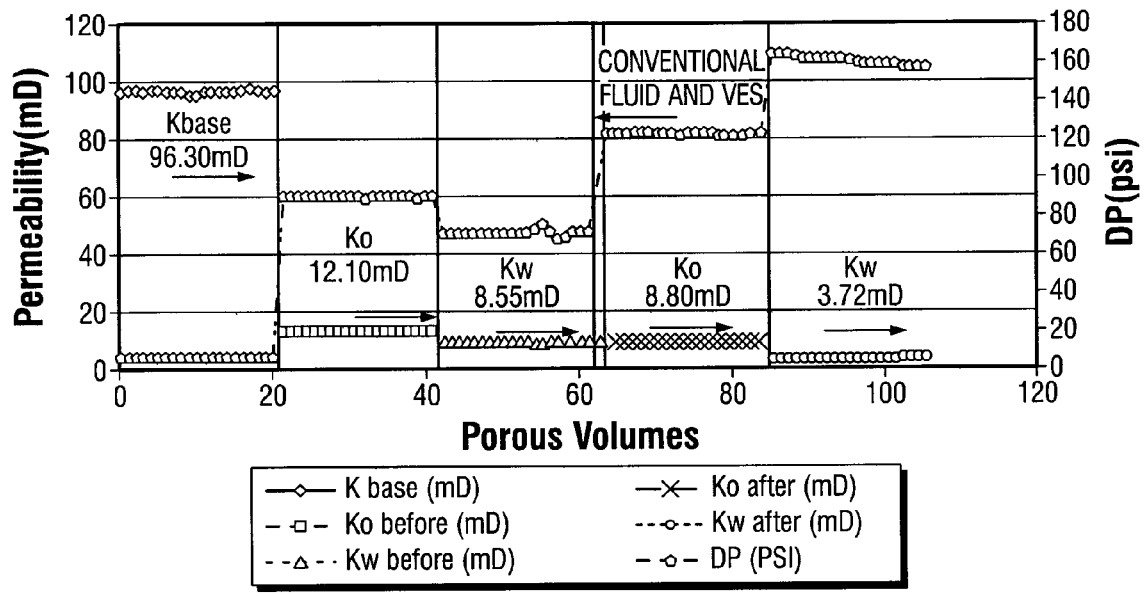
FIG. 11 and FIG. 12 show comparison between effective permeability to water of the composition according to one embodiment of the invention and of a prior art solution.
Figure 12:
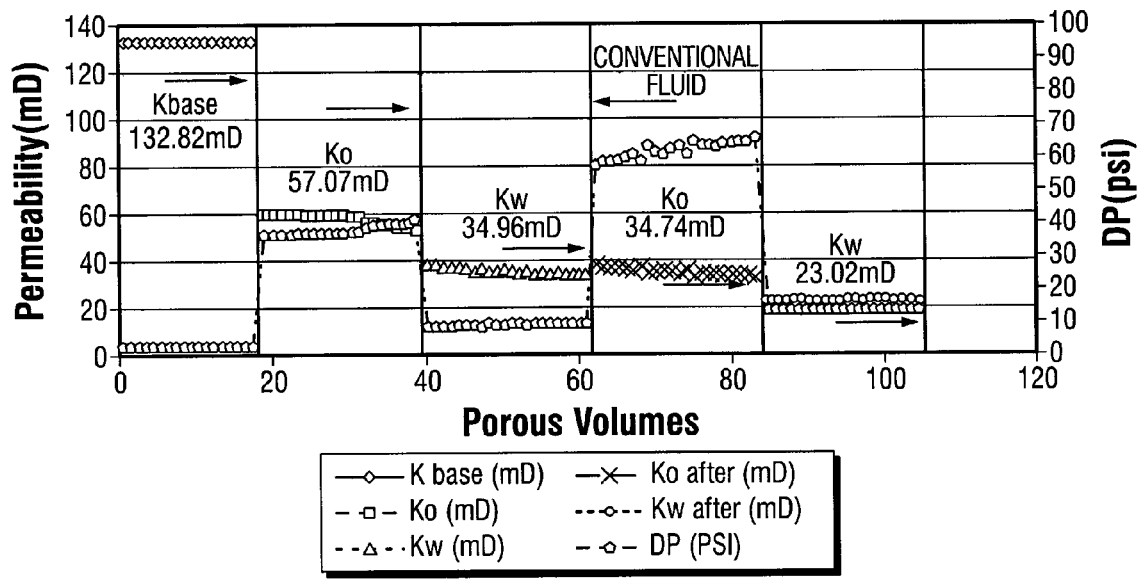

The same disproportionate permeability reduction to water is observed if a low concentration of a viscoelastic surfactant is added to a crosslinked polymer fracturing fluid, for example, one which has a low pH. FIG. 11 shows the changes in the effective permeability to water after performing a static leakoff test (30 min injection at 3.4 MPa-500 psi) with a low pH (20/1000 gal) crosslinked fracturing fluid with 0.05% by weight of VES. FIG. 12 shows the same static leakoff test but without VES.

Results are shown in Tables 4 and 5. There is a disproportionate permeability reduction to water change when VES is included in the frac fluid (which is a conventional frac fluid) which is not evident when performing the same test with only the fracturing fluid. The same difference can be seen in the residual saturations and permeability to water. It shows that the fluid according to the invention is effective in the use with conventional stimulation fluids, as for example fracturing fluid.

TABLE 4

|  | Frac gel + VES | | | Frac gel | | |
| --- | --- | --- | --- | --- | --- | --- |
|  | before | after | % change | before | after | % change |
| $K_w$ (mD) | 8.55 | 3.7 | −57% | 35 | 23 | −35% |
| $K_o$ (mD) | 12 | 8.8 | −27% | 57 | 35 | −38% |

TABLE 5

|  | Frag gel + VES | | |
| --- | --- | --- | --- |
|  | before | after | % change |
| $S_{wr}$ | 0.28 | 0.37 | +32% |
| $K_{ro}$ a $S_{wr}$ | 0.12 | 0.09 | −25% |
| $S_{or}$ | 0.34 | 0.40 | +17% |
| $K_{rw}$ a $S_{or}$ | 0.08 | 0.03 | −62% |

Oil Recovery Experiments

A test was run to determine the effect of injecting a 8:1 weight ratio solution of water:decyl-dimethyl amine oxide (VES) and methanol into a known oil wet formation (tested on a Bandera core) using crude which is known to be oil-wetting.

The result shows that the effective permeability to crude increased substantially (of 65%) while there was no change in the effective permeability to water. This indicates that the injection of VES and methanol changed the wettability of the formation from strongly oil wet to strongly water wet.

Figure 13:
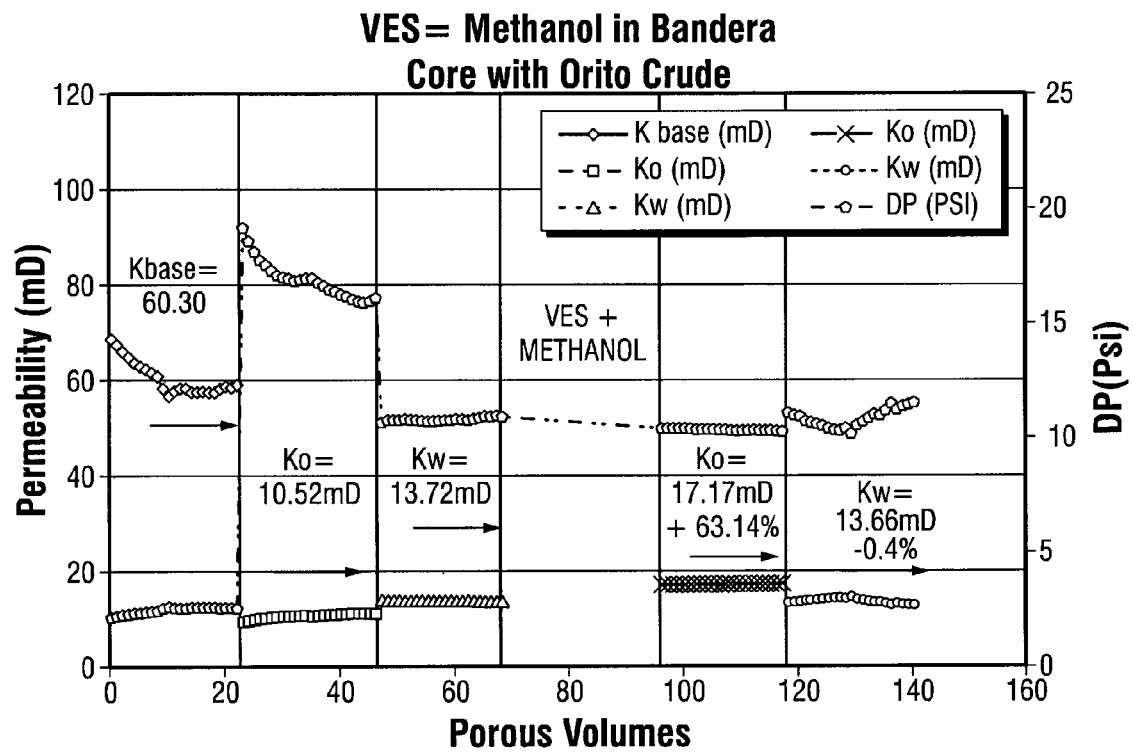
FIG. 13 shows effective permeability for an oil wet core of the composition according to one embodiment of the invention.
Figure 14:
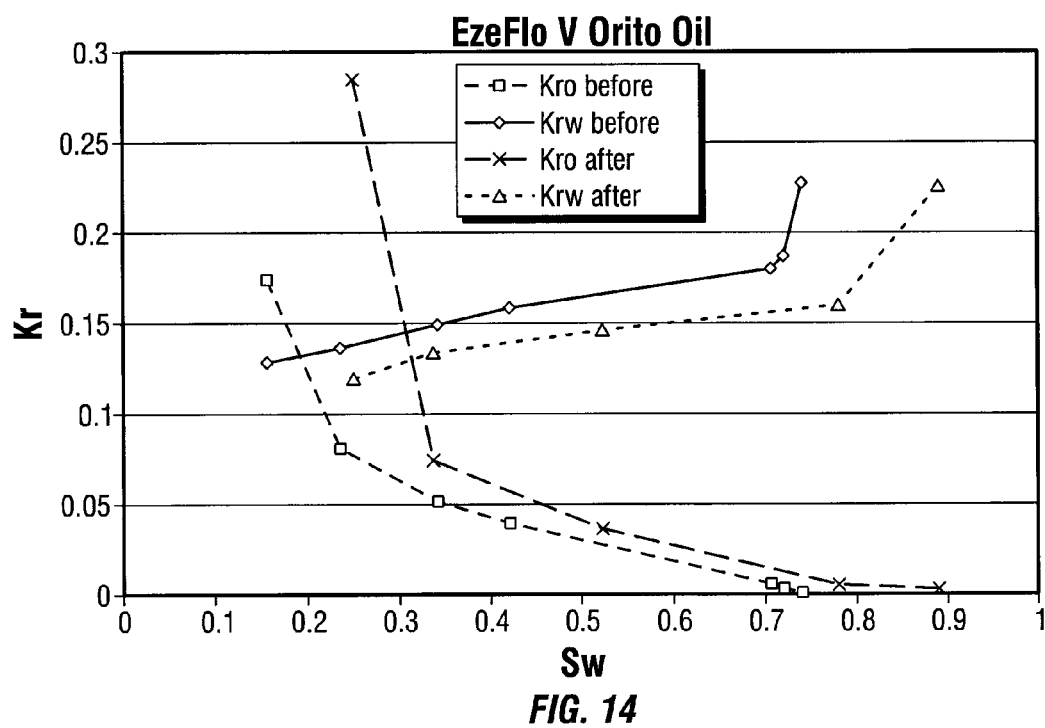
FIG. 14 shows relative permeability for an oil wet core of the composition according to one embodiment of the invention.

FIG. 13 shows the changes in the effective permeability for an oil wet core. FIG. 14 shows the changes in the relative permeability for the core. The changes in relative permeability shown in FIG. 13 are summarized in Table 6. The residual oil saturation is reduced of more than 50%. The relative permeability to the oil is increasing at all saturation values, the slope of the curve being steeper after the treatment than before, indicating that the mobility of the oil is increasing through the porous media. The relative permeability to the water is reduced at all saturation values and the slope of the curve is flatter after the treatment, indicating that the mobility of the water is greatly reduced. The mobility of the oil increasing after the injection of the treatment while the mobility of water decreasing due to the increased residual saturation shows that fluid according to the invention is especially preferred for improving oil recovery.

TABLE 6

|  | VES + methanol | | |
| --- | --- | --- | --- |
|  | before | after | % change |
| $S_{wr}$ | 0.156 | 0.25 | +60% |
| $K_{ro}$ a $S_{wr}$ | 0.174 | 0.284 | +63% |
| $S_{or}$ | 0.26 | 0.11 | −58% |
| $K_{rw}$ a $S_{or}$ | 0.22 | 0.225 | +2% |

It is clear that the present invention is well adapted to carry out its objectives and attain the ends and advantages mentioned above as well as those inherent therein. While embodiments of the invention have been described in varying detail for purposes of disclosure, it will be understood that numerous changes may be made which will readily suggest themselves to those skilled in the art and which are encompassed within the spirit of the invention disclosed and as defined in the written description and appended claims.

What is claimed is:

1. A method for changing the water permeability of a subterranean formation of a well, the method comprising:
   a. providing a fluid comprising a liquid carrier with a salt, methanol and a viscoelastic surfactant, wherein methanol is present in an amount of 5% to 15% by weight and the salt is present in an amount of 1% to 3% by weight and the viscoelastic surfactant is a cationic surfactant present in an amount of 0.01% to 0.5% by weight;
   b. introducing the fluid into the well; and
   c. contacting the fluid and the subterranean formation wherein the action of the liquid carrier, methanol and the viscoelastic surfactant is able to change the water permeability of the subterranean formation.

2. The method of claim 1, wherein contacting the fluid and the subterranean formation further comprises fracturing the formation.

3. The method of claim 1, wherein the liquid carrier is water.

4. The method of claim 1, wherein the salt is selected from the group consisting of: sodium chloride, ammonium chloride, potassium chloride, calcium chloride, calcium carbonate, sodium carbonate, and combinations thereof.

5. The method of claim 2, wherein the fluid further comprises a proppant.

6. A method for reducing the amount of water produced from a subterranean formation of a well, the method comprising:
   a. providing a fluid comprising a liquid carrier, a salt methanol and a viscoelastic surfactant, wherein the fluid has relative permeability properties, wherein methanol is present in an amount of 5% to 15% by weight and the salt is present in an amount of 1% to 3% by weight;
   b. introducing the fluid into the well and the viscoelastic surfactant is a cationic surfactant present in an amount of 0.01% to 0.5% by weight; and
   c. contacting the fluid and the subterranean formation.

7. The method of claim 6, wherein no relatively permeability modifier polymer is further added.

8. The method of claim 6, wherein contacting the fluid and the subterranean formation further comprises fracturing the formation.

9. The method of claim 8, wherein fracturing further comprises proppant.

10. The method of claim 6, wherein the liquid carrier is water.

11. The method of claim 6, wherein the salt is included in the liquid carrier.

12. The method of claim 11, wherein the liquid carrier is brine.

13. The method of claim 6, wherein the salt is selected from the group consisting of: sodium chloride, ammonium chloride, potassium chloride, calcium chloride, calcium carbonate, sodium carbonate, and combinations thereof.

14. A method for improving the oil recovery from a subterranean formation of a well, the method comprising:
   a. providing a fluid comprising a liquid carrier with a salt, methanol and a viscoelastic surfactant, wherein methanol is present in an amount of 5% to 15% by weight and the salt is present in an amount of 1% to 3% by weight and the viscoelastic surfactant is a cationic surfactant present in an amount of 0.01% to 0.5% by weight;
   b. introducing the fluid into the well; and
   c. contacting the fluid and the subterranean formation wherein the action of the liquid carrier and the viscoelastic surfactant is able to improve oil mobility in the subterranean formation.

15. The method of claim 14, wherein the salt is selected from the group consisting of: sodium chloride, ammonium chloride, potassium chloride, calcium chloride, calcium carbonate, sodium carbonate, and combinations thereof.

* * * * *